United States Patent
Leavitt et al.

(10) Patent No.: US 12,332,870 B2
(45) Date of Patent: Jun. 17, 2025

(54) DEVICES, METHODS, AND SYSTEMS FOR GENERATING A HIGHLY-SCALABLE, EFFICIENT COMPOSITE RECORD INDEX

(71) Applicant: Blue Voyant LLC, New York, NY (US)

(72) Inventors: Tucker Leavitt, Durango, CO (US); Adam Najman, Jersey City, NY (US); Alfredo Gimenez, Daly City, CA (US); Tyler Flach, New York, NY (US); Abdul Khan, New York, NY (US); Jonathan Greenblatt, New York, NY (US)

(73) Assignee: BlueVoyant LLC, New York, NY (US)

( * ) Notice: Subject to any disclaimer, the term of this patent is extended or adjusted under 35 U.S.C. 154(b) by 0 days.

(21) Appl. No.: 18/860,966

(22) PCT Filed: Jun. 4, 2023

(86) PCT No.: PCT/US2023/024386
§ 371 (c)(1),
(2) Date: Oct. 28, 2024

(87) PCT Pub. No.: WO2023/235619
PCT Pub. Date: Dec. 7, 2023

(65) Prior Publication Data
US 2025/0110939 A1   Apr. 3, 2025

Related U.S. Application Data

(60) Provisional application No. 63/365,819, filed on Jun. 3, 2022.

(51) Int. Cl.
G06F 16/22       (2019.01)
G06F 16/2455    (2019.01)
(Continued)

(52) U.S. Cl.
CPC .... *G06F 16/2282* (2019.01); *G06F 16/24568* (2019.01); *G06F 16/258* (2019.01); *G06F 16/27* (2019.01)

(58) Field of Classification Search
CPC .......... G06F 16/2282; G06F 16/24568; G06F 16/258; G06F 16/27
See application file for complete search history.

(56) References Cited

U.S. PATENT DOCUMENTS 9,276,959 B2    3/2016  Theimer et al.
2014/0089523 A1  3/2014  Roy et al.
(Continued)

FOREIGN PATENT DOCUMENTS

WO    2023235619 A1   12/2023

OTHER PUBLICATIONS

International Search Report and Written Opinion for corresponding International Application No. PCT/US2023/024386, mailed Aug. 31, 2023.
(Continued)

*Primary Examiner* — Dangelino N Gortayo
(74) *Attorney, Agent, or Firm* — K&L Gates LLP

(57) ABSTRACT

The present disclosure describes a method and system for processing and indexing data from a continuously updated distributed database. The method and system employ a portioned database architecture to return results in a constant-time query and reduce the storage size of indexed records. The database partitions include a plurality of data records correspond to an index group in a single row of a rowKey table. The index group comprises data records that are indexed in a predetermined indexing interval. The portioned database architecture allows record fields to be queried from the index group.

20 Claims, 5 Drawing Sheets

(51) Int. Cl.
    *G06F 16/25*     (2019.01)
    *G06F 16/27*     (2019.01)

(56) References Cited

U.S. PATENT DOCUMENTS

| | | |
|---|---|---|
| 2015/0278311 A1 | 10/2015 | Isherwood et al. |
| 2015/0295779 A1 | 10/2015 | Ching et al. |
| 2018/0006912 A1* | 1/2018 | Sokolik .................. G06F 16/22 |
| 2018/0167353 A1 | 6/2018 | Kaliski, Jr. |
| 2019/0294598 A1* | 9/2019 | Hsiao ..................... G06F 16/22 |
| 2022/0148084 A1 | 5/2022 | Baker |
| 2023/0019180 A1* | 1/2023 | de Nijs ................. G06F 21/577 |

OTHER PUBLICATIONS

Shen et al. "Evaluation and Comparison of BIND, PONS and Navitas as ENUM Server," Columbia University Computer Science, Sep. 30, 2006 <https://mice.cs.columbia.edu/getTechreport.php?techreportID=412&format=pdf&>.

Dickinson et al. "Compacted-DNS (C-DNS): A Format for DNS Packet Capture," Internet Engineering Task Force ,—Wikimedia Foundation Inc., Sep. 30, 2019 <https:/1www.rfc-editor.org/rfc/pdfrfc/rfc8618.txt.pdf>.

\* cited by examiner

DEVICES, METHODS, AND SYSTEMS FOR GENERATING A HIGHLY-SCALABLE, EFFICIENT COMPOSITE RECORD INDEX

CROSS-REFERENCE TO RELATED APPLICATIONS

This application is a U.S. National Stage Entry under 35 U.S.C. § 371 of International Patent Application No. PCT/US2023/024386, entitled DEVICES, METHODS, AND SYSTEMS FOR GENERATING A HIGHLY-SCALABLE, EFFICIENT COMPOSITE RECORD INDEX, filed Jun. 4, 2023, which claims priority to U.S. Provisional Patent Application No. PCT/US2023/021736, titled DEVICES, METHODS, AND SYSTEMS FOR GENERATING A HIGHLY-SCALABLE, EFFICIENT COMPOSITE RECORD INDEX, filed Jun. 3, 2022, the disclosures of which are incorporated by reference in their entirety herein.

TECHNICAL FIELD

The present disclosure is generally related to network security, and, more particularly, is directed to improved systems and methods for processing and indexing files from a continuously updated database. In conventional indexing schemas, the system can become overwhelmed by the number of records and adversely affects read speeds, storage table sizes, querying times. Some of these issues can be overcome through a substantial increase in processing resources and storage space, but this petabytes of data, this solution can become prohibitively expensive.

SUMMARY

The following summary is provided to facilitate an understanding of some of the innovative features unique to the aspects disclosed herein, and is not intended to be a full description. A full appreciation of the various aspects can be gained by taking the entire specification, claims, and abstract as a whole.

In one non-limiting aspect, the present disclosure describes a method for indexing records in scalable partitioned data tables that enable constant-time queries. The method can include: receiving, by a processor, a stream of pDNS records from one or more data sources; aggregating, by the processor, the stream of pDNS records to a distributed databases; performing, by the processor, a first structured streaming job on the distributed databases, wherein the first structured streaming job processes a first micro-batch of pDNS records, reformat the records into an extensible format, groups the records according to the first byte of the requesting IP addresses, and writes the pDNS records to a group file, and wherein subsequent structure streaming jobs are continuously triggered and initiated within a predetermined time period of the prior structured streaming job; performing, by the processor, an indexing job on a plurality of group files, wherein the indexing job reads a first set of group files and generates an index for all queryable fields of a the pDNS records, and wherein a new indexing job is performed according to a predetermined indexing job interval; writing, by the processor, an index group to a first row in a rowkey table, wherein the index group is grouped according to an event timestamp of pDNS records that are indexed during the predetermined indexing job interval; querying, by the processor, the rowKey table according to a set of queryable parameters of the pDNS records, wherein the query results are returned at a constant-time.

In another non-limiting aspect, the present disclosure describes a system for indexing records that are returned in a constant time query for a scalable database. The system can include: at least one processor; at least one memory communicatively coupled to the at least one processor; an input/output interface configured for accessing data from one or more external source, each of the plurality of external sources communicatively coupled to the at least one processor; a database residing in the at least one memory and configured to store the data; and wherein the at least one memory is configured to store instructions executable by the at least one processor to: receive a stream of pDNS records from one or more data sources; aggregate the stream of pDNS records to a distributed databases; perform a first structured streaming job on the distributed databases, wherein the first structured streaming job processes a first micro-batch of pDNS records, reformat the records into an extensible format, groups the records according to the first byte of the requesting IP addresses, and writes the pDNS records to a group file, and wherein subsequent structure streaming jobs are continuously triggered and initiated within a predetermined time period of the prior structured streaming job; perform an indexing job on a plurality of group files, wherein the indexing job reads a first set of group files and generates an index for all queryable fields of a the pDNS records, and wherein a new indexing job is performed according to a predetermined indexing job interval; write an index group to a first row in a rowkey table, wherein the index group is grouped according to an event timestamp of pDNS records that are indexed during the predetermined indexing job interval; query the rowKey table according to a set of queryable parameters of the pDNS records, wherein the query results are returned at a constant-time.

Figure 1:
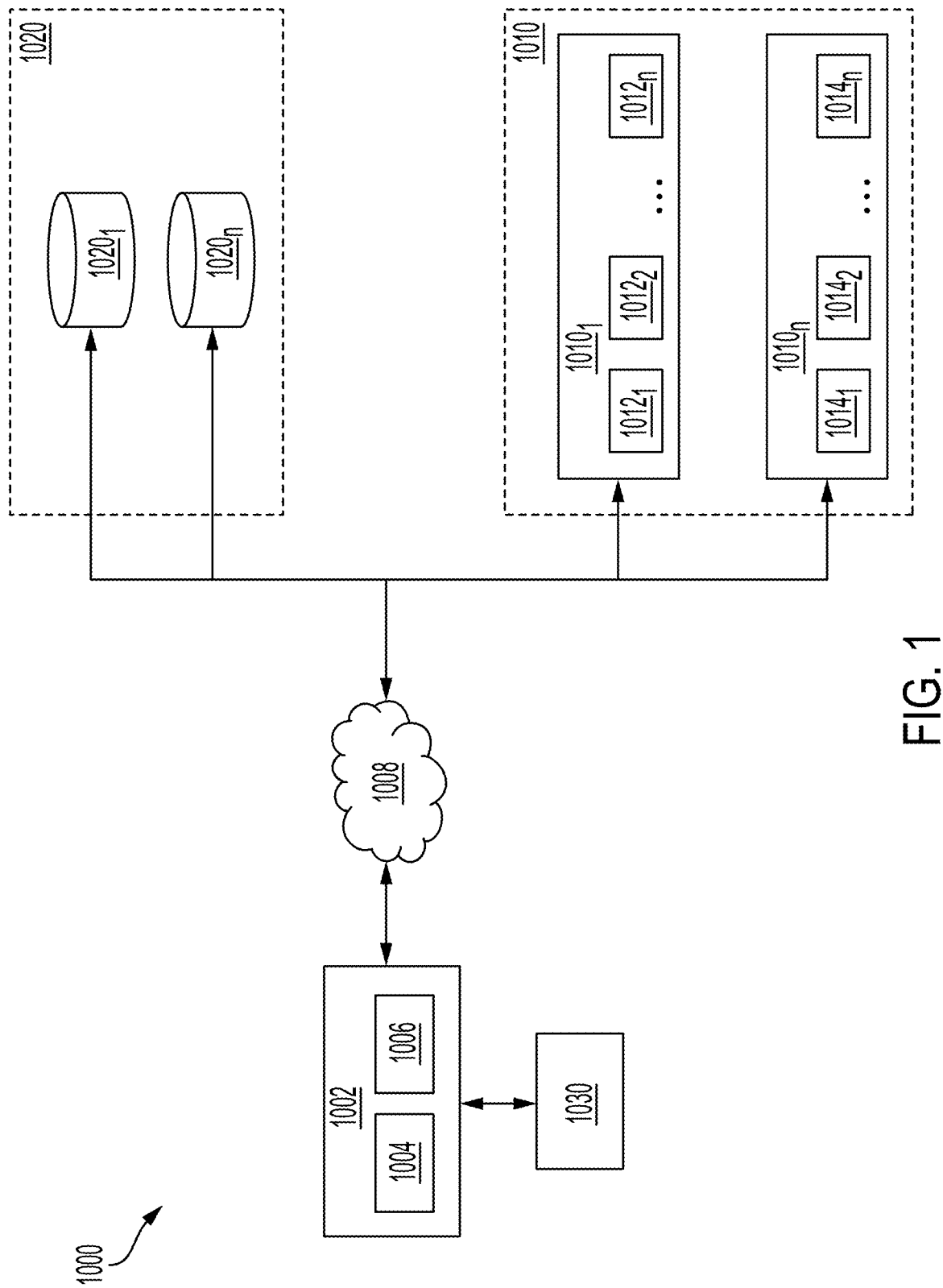
FIG. 1 illustrates a system configured for Security Information and Event Management (SIEM) implementation across multiple tenants, in accordance with at least one aspect of the present disclosure.

Corresponding reference characters indicate corresponding parts throughout the several views. The exemplifications set out herein illustrate various aspects of the present disclosure, in one form, and such exemplifications are not to be construed as limiting the scope of the present disclosure in any manner.

DETAILED DESCRIPTION

The Applicant of the present application owns the following U.S. Provisional Patent Applications, the disclosure of each of which is herein incorporated by reference in its entirety:

International Patent Application No. PCT/US2022/ 072739, titled DEVICES, SYSTEMS, AND METHODS FOR ENHANCING SECURITY INFORMATION & EVENT MANAGEMENT UPDATES FOR MULTIPLE TENANTS BASED ON CORRELATED, AND SYNERGISTIC DEPLOYMENT NEEDS, filed on Jun. 3, 2022;

International Patent Application No. PCT/US2022/ 072743, titled DEVICES, SYSTEMS, AND METHODS FOR STANDARDIZING & STREAMLINING THE DEPLOYMENT OF SECURITY INFORMATION & EVENT MANAGEMENT ARTIFACTS FOR MULTIPLE TENANTS, filed on Jun. 3, 2022;

International Patent Application No. PCT/US2022/ 082167, titled DEVICES, SYSTEMS, AND METHODS FOR PROVISIONING AND UPDATING SECURITY INFORMATION & EVENT MANAGEMENT ARTIFACTS FOR MULTIPLE TENANTS, filed on Dec. 21, 2022;

International Patent Application No. PCT/US2022/ 082173, titled DEVICES, SYSTEMS, AND METHODS FOR STREAMLINING AND STANDARDIZING THE INGEST OF SECURITY DATA ACROSS MULTIPLE TENANTS, filed on Dec. 21, 2022;

International Patent Application No. PCT/US2023/ 061069, titled DEVICES, SYSTEMS, AND METHODS FOR REMOTELY MANAGING ANOTHER ORGANIZATION'S SECURITY ORCHESTRATION, AUTOMATION, AND RESPONSE, filed on Jan. 23, 2023;

International Patent Application No. PCT/US2023/ 0612894, titled DEVICES, SYSTEMS, AND METHODS FOR IDENTIFYING CYBER ASSETS AND GENERATING CYBER RISK MITIGATION ACTION BASED ON DOMAIN REDIRECTS, filed on Feb. 20, 2023;

International Patent Application No. PCT/US2023/ 021736, titled DEVICES, SYSTEMS, AND METHODS FOR SUMMARIZING ANALYTIC OBSERVATIONS, filed on May 10, 2023;

International Patent Application No. PCT/US2023/ 022858, titled DEVICES, SYSTEMS, AND METHODS FOR INGESTING & ENRICHING SECURITY INFORMATION TO AUTONOMOUSLY SECURE A PLURALITY OF TENANT NETWORKS, filed on May 19, 2023; and U.S. Provisional Patent Application No. PCT/US2023/ 022535 titled DEVICES, SYSTEMS, AND METHODS FOR IDENTIFYING CYBER ASSETS AND GENERATING CYBER RISK MITIGATION ACTIONS BASED ON A DEMOCRATIC MATCHING ALGORITHM, filed on May 17, 2023.

Numerous specific details are set forth to provide a thorough understanding of the overall structure, function, manufacture, and use of the aspects as described in the disclosure, and illustrated in the accompanying drawings. Well-known operations, components, and elements have not been described in detail so as not to obscure the aspects described in the specification. The reader will understand that the aspects described, and illustrated herein are non-limiting aspects, and thus it can be appreciated that the specific structural, and functional details disclosed herein may be representative, and illustrative. Variations, and changes thereto may be made without departing from the scope of the claims.

Before explaining various aspects of the systems, and methods disclosed herein in detail, it should be noted that the illustrative aspects are not limited in application or use to the details disclosed in the accompanying drawings, and description. It shall be appreciated that the illustrative aspects may be implemented or incorporated in other aspects, variations, and modifications, and may be practiced or carried out in various ways. Further, unless otherwise indicated, the terms, and expressions employed herein have been chosen for the purpose of describing the illustrative aspects for the convenience of the reader, and are not for the purpose of limitation thereof. For example, it shall be appreciated that any reference to a specific manufacturer, software suite, application, or development platform disclosed herein is merely intended to illustrate several of the many aspects of the present disclosure. This includes any, and all references to trademarks. Accordingly, it shall be appreciated that the devices, systems, and methods disclosed herein can be implemented to enhance any software update, in accordance with any intended use, and/or user preference.

As used herein, the term "server" may refer to or include one or more computing devices that are operated by or facilitate communication, and processing for multiple parties in a network environment, such as the Internet or any public or private network. Reference to "a server" or "a processor," as used herein, may refer to a previously-recited server, and/or processor that is recited as performing a previous step or function, a different server, and/or processor, and/or a combination of servers, and/or processors.

As used herein, the term "constant" may refer to one or more Security Information and Event Management (SIEM) functions that remain unchanged during the issuance of an alert. For example, a constant can include an Azure Sentinel Log Analytics function, amongst others. According to some non-limiting aspects, a constant can be specifically configured in accordance with an individual client's preferences and/or requirements. For example, alert rules, as described herein, can be the same for all client deployments. However, the apparatuses, systems, and methods disclosed herein can employ client-specific constants to "fine tune" how alerts are managed for each particular client. In other words, each constant can include a whitelist of specific protocols, accounts, etc. which the alert rule manages those constants differently (e.g., skips them).

As used herein, the term "network" may refer to or include an entire enterprise information technology ("IT") system, as deployed by a tenant. For example, a network can include a group of two or more nodes (e.g., assets) connected by any physical and/or wireless connection and configured to communicate and share information with the other node or nodes. However, the term network shall not be limited to any particular nodes or any particular means of connecting those nodes. A network can include any combination of assets (e.g., devices, servers, desktop computers, laptop computers, personal digital assistants, mobile phones, wearables, smart appliances, etc.) configured to connect to an ethernet, intranet, and/or extranet and communicate with one another via an ad hoc connection (e.g., Bluetooth®, near field communication ("NFC"), etc.), a local area connection ("LAN"), a wireless local area network ("WLAN"), and/or a virtual private network ("VPN"), regardless of each devices' physical location. A network can further include any tools, applications, and/or services deployed by devices, or otherwise utilized by an enterprise IT system, such as a firewall, an email client, document management systems, office systems, etc. In some non-limiting aspects, a "network" can include third-party devices, applications, and/or services that, although they are owned and controlled by a third party, are authorized by the tenant to access the enterprise IT system.

As used herein, the term "platform" can include software architectures, hardware architectures, and/or combinations thereof. A platform can include either a stand-alone software product, a network architecture, and/or a software product configured to integrate within a software architecture and/or a hardware architecture, as required for the software product to provide its technological benefit. For example, a platform can include any combination of a chipset, a processor, a logic-based device, a memory, a storage, a graphical user interface, a graphics subsystem, an application, and/or a communication module (e.g., a transceiver). In other words, a platform can provide the resources required to enable the technological benefits provided by software. According to some non-limiting aspects, the technological benefit provided by the software is provided to the physical resources of the ecosystem or other software employed by physical resources within the ecosystem (e.g., APIs, services, etc.). According to other non-limiting aspects, a platform can include a framework of several software applications intended and designed to work together.

As used herein, the term "Security Monitoring Platform" may refer to or include software configured to aggregate and analyze activity from many different resources across an entire information technology infrastructure. For example, a Security Monitoring Platform can include an SIEM platform and/or other types of platforms used to monitor and/or analyze data (e.g., SIpunk Enterprise Security, Microsoft Sentinel, Datadog Security Monitoring, ELK, etc.). The various aspects of the devices, systems, and methods disclosed herein as they relate to SIEM can similarly apply to any type of Security Monitoring Platform.

Examples of commonly implemented SIEMs include Azure Sentinel and Splunk Cloud, Devo, LogRhythm, IBM's QRadar, Securonix, McAfee Enterprise Security Manager, LogPoint, Elastic Stack, ArcSight Enterprise Security Manager, InsightIDR, amongst others. Deploying Azure Sentinel as a cloud-based tool, specifically, has become a popular choice amongst managed security service providers ("MSSPs") and therefore, Azure Sentinel will be discussed as a non-limiting example. However, it shall be appreciated that the other SIEMs are contemplated by the present disclosure. Like most SIEMs, deploying Azure Sentinel requires a high level of skill, and, at the same time, it could be very time consuming, and error prone. Each organization that needs a security solution has special needs around monitoring, and alerting, the log sources to ingest, the detection/alert rules, the response automation, reporting, etc. Although Microsoft (MSFT) is often used by MSSPs to manage multiple clients, the complexity of the initial configuration, deployment, and ongoing maintenance of artifacts (e.g., resource groups, log analytics workspaces, alert rules, workbooks, playbooks, etc.), has been increasing significantly. This can result in a high cost for both the MSSP—who must hire more expensive specialists—and for the client, who often bears at least a portion of the increasing expenses. However, there is often an overlap between some of the deployment needs of varying clients.

For example, many organizations may require similar firewall monitoring solutions. In such instances, asset reuse, and re-deployment (and update) may lead to major cost reduction, and simplicity of operations. Unfortunately, known SIEM tools are technologically incapable of taking advantage of such synergies. Thus, from the initial provisioning, and throughout the automation of incident responses, MSSPs are left with limited re-use opportunities to capture efficiencies across multiple clients. Accordingly, there is a need for improved devices, systems, and methods to implement, and issuing SIEM client updates. Such enhancements could improve the technological performance, and cost effectiveness of SIEM, including the deployment of detection rules, visualizations, investigation workbooks, and ongoing maintenance.

It may be beneficial to aggregate data (e.g., log data, event data, threat intelligence data, etc.) from multiple platforms, and provide that data to systems, such as an SIEM platform, to process and catch malicious behavior or draw other meaningful conclusions. For example, it can be beneficial to collect records from network devices, servers, domain controllers, and more. Once collected, records can be stored, normalized, aggregated, and analyzed to discover trends, detect threats, and enable organizations to investigate alerts. Although known SIEM tools (also referred to herein as SIEM detection engines) can offer a certain degree of functionality, including the ability to monitor events, collect data, and issue security alerts across a network, such tools are typically tailored for an implementing organization, and—more specifically—a particular network architecture, which can oftentimes be complex.

Specifically, as it pertains to the critical data aggregation required to effectively secure a network, conventional tools are insufficient to monitor and aggregate data at scale, efficiently. For example, in order to monitor and aggregate data across a large number of tenant (or client) networks, MSSPs would have to receive a data stream including roughly two-million records (e.g., pDNS records) per second and conventional tools would need to be able to efficiently store, retrieve, and analyze relevant records for specific requesting ip addresses, answer ip addresses, queried domain names (e.g., Qnames), and queried subdomains over a time range of several months in a cost-efficient manner. Accordingly, conventional tools are incapable of monitoring and aggregating the records necessary to identify malicious activity in footprints of interest and thus, cannot effectively identify key security metrics, including security appliances, software vendors, and/or traffic of interest for specific use-cases, amongst others.

In other words, conventional tools are technologically incapable of aggregating and/or managing a high throughput of records because the nature and volume of those records requires a "write rate" that exceeds their rated performance. Similarly, conventional tools are technologically incapable of maintaining an index for efficient queries, and the resulting volume of data is prohibitively large for users to effectively and/or efficiently search for records of interest to a particular tenant network, especially when managing the security of a large number of tenant networks.

Accordingly, there is a need for devices, systems, and methods for generating and utilizing a highly-scalable, composite record index to enhance network security. Such devices, systems, and methods, have numerous practical applications and provide numerous technological improvements over known tools, including efficient querying and processing of records (e.g., pDNS data) for a particular protocol or domain, including records in volumes of tens of trillions of records in mere seconds, while maintaining a high write throughput at low costs. Accordingly, such devices, systems, and methods can be used to repeatedly scale cloud-based data aggregations with consistency and without compromising quality of search results.

The present disclosure presents such devices, systems, and methods, all of which provide many technological benefits, which enable users to deploy, at scale, repeatedly, and consistently, cloud-based SIEM implementations, such as Azure Sentinel implementations, according to one non-limiting aspect. For example, the devices, systems, and methods disclosed herein can provide: (1) a record (e.g., pDNS) file partitioning scheme, 2) a streaming clustering algorithm to quickly accumulate and emit files using this scheme, 3) an efficient query index for those files, implemented in Google Bigtable, and 4) an efficient algorithm to update the query index as the partitioned files are written. The resulting composite index can include partitioned files and a separate index, which enables an SIEM or other user to write two-million records per second along with their associated index values and query the resulting data for specified assets of interest within seconds among tens of trillions of written pDNS records.

The composite index can include a streaming distributed database that accumulates records from our various sources. For example, an structured streaming job (e.g., Apache Spark) can be run on a cloud-based platform (e.g., Google Cloud Dataproc) to continually read and process a records stream from the composite index in small batches called micro-batches. The records can be grouped in each micro-batch by the first byte of the requesting protocol, which improves performance later in the pipeline. The records can be subsequently written as files (e.g., Apache Avro) on a cloud-based storage platform (e.g., Google Cloud Storage). According to the present disclosure, the grouped, written, and stored records can serve as a primary data store layer for a pDNS Database, and can support a very high write throughput (e.g., six-million records per second). Not only are conventional MSSP devices, systems, and methods technologically incapable of automation, but it would be highly impractical—if not impossible—for an MSSP to manually continuously aggregate and manage millions of records in real-time.

FIG. 1 illustrates a system 1000 configured for Security Information and Event Management (SIEM) implementation across multiple tenants is illustrated, in accordance with at least one non-limiting aspect of the present disclosure. The system 1000 can include a SIEM provider server 1002 comprising a memory 1004 and a processor 1006. In various aspects, SIEM provider server 1002 can comprise the computer system 5000 and the various components thereof (e.g., processor 1006 can be similar to processor(s) 5004, memory 1004 can be similar to main memory 5006, etc.), as will be discussed in further reference to FIG. 5.

In various aspect, the memory 1004 may be configured to store instructions that, when executed by processor 1006, cause the request for data from a plurality of data sources 1010, 1020. The provider server 1002 receives petabytes of raw data from clients or third parties. The data may comprise global internet traffic, of which the network security computing system may only be interested in a faction of the overall data set. Upon receipt of the raw data, the network provider server or computing system aggregates, processes, indexes the data to create a queryable index table that points back to the original record. The index table may be stored locally on the provider server 1002 or on the back-end server 1030. Additionally, the provider server 1002 may operate as a front-end and retrieve query results from the back-end server 1030.

As the dataset continues to grow, it becomes difficult to query a desired field due to the size of the dataset. The database architecture faces competing interests between query response time and cost of computing resources. It can become prohibitively expensive to return query results in a reasonable time due to the cost of computing resources to process and index data and storage space for index tables. The present disclosure describes a data indexing schema for continuously updated datasets that comprise petabytes of data, and require scalability daily updates. The data indexing schema provides a database architecture that partitions index tables and the original data in order to return query results in a constant-time query.

In comparison to the disclosed data indexing schema, writing individual records or cyber data directly to a distributed key-value database, like Google BigTable would require duplicating data across the keys for different fields or writing backpointers of some kind. This data duplication would require significantly more table nodes (up to 4× more) in order to keep up with the write rate in the security operations center (SOC) environment.

Figure 2:
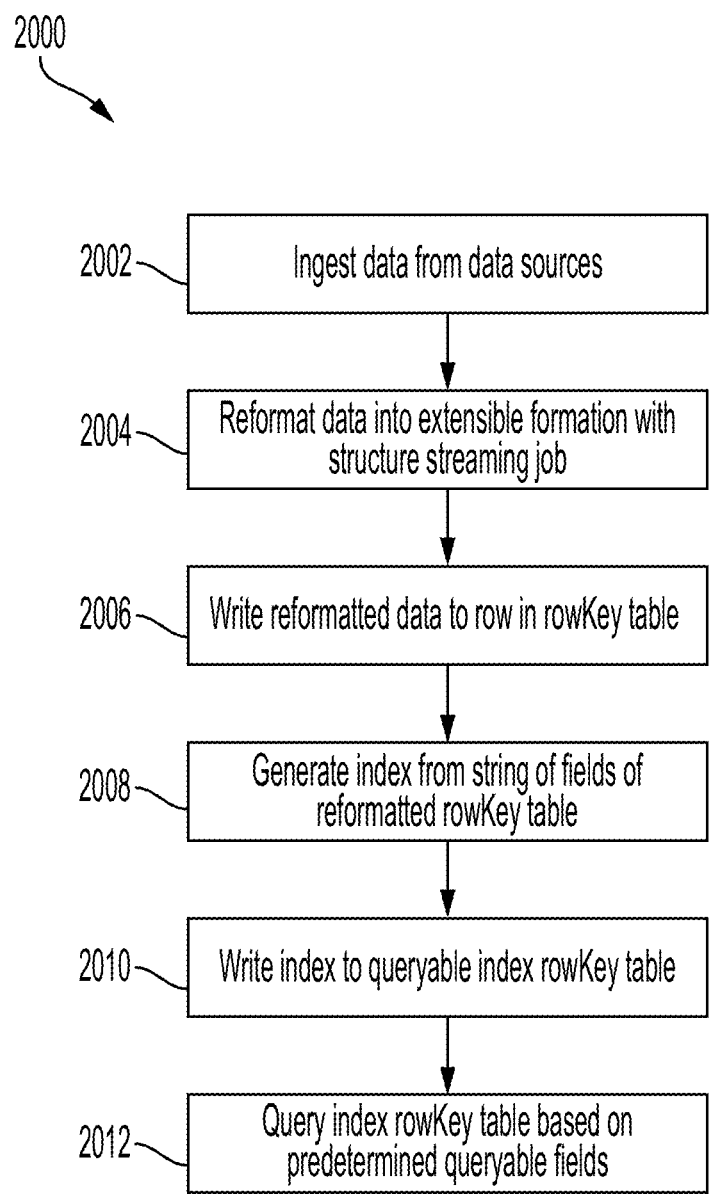
FIG. 2 illustrates a high-level flow diagram of the data indexing schema, in accordance with at least one aspect of the present disclosure.

FIG. 2 shows a high-level flow diagram of the data indexing schema. The system receives 2002 the data from one or more data sources, and aggregates 2004 the data into a distributed database. The system reformats 2006 the data into a common extensible format and writes the data to a file in a distributed blob storage system (e.g., Google Cloud Storage, Amazon S3, etc.). The system reads the records from the files and generates an index based on a string of fields from the records. The System writes 2010 the indices to a queryable key-value database. The key-value database receives 2012 queries from a front-end computing system and retrieves data based on the index pointing to the location of the original record.

In various aspects, the system retrieves cyber event data from one or more third party sources and aggregates the cyber event data into a single dataset. Data may be received or retrieved on a daily basis according to data type and rate of change of the cyber event data. In one aspect, the system correlates the cyber event data to a dynamic asset and provides a third party source with an accurate assessment of the cyber event data as soon as possible. In one aspect, the cyber event data may comprise asset behavior at a specific time that correlates to malicious behavior or jeopardizes the security of a system. In another aspect, the cyber event data may comprise asset information such as software versions, firmware versions, update histories, etc. Due to the dynamic nature of the cyber event data, the data may become stale and outdated in a short period of time (e.g. days or weeks). Therefore, the dataset needs to continuously be updated so the system can maintain a chain of continuity for the dynamic asset.

Once the system creates a queryable index table, the dataset may be queried based on timestamps or assets of interests. In one aspect, an entity is defined by their footprints which include a plurality of assets that are owned and controlled by the entity. All information related to an entity's footprints may be queried, according to an IP address or domain, and retrieved in constant-time queries of the entity assets. A key advantage of the data indexing schema is that there is little change in the query response time as the amount of data or records increases in the dataset.

In the present aspect, the network security computing system ingests data from a plurality of data sources and aggregates the data into a single distributed dataset. The data is then reformatted in an original format such as JSON, of CSV text, and translated into an extensible format such as an extensible JSON file like Apache Avro or Apache Parquet. The files are written to a distributed blob-storage system (Google Cloud Storage in our case, Amazon S3 is another example).

DNS records contain multiple Internet Protocol address (IP address) fields (e.g. the packet source IP, the packet destination IP, and the DNS answer IPs, among others) and multiple internet domain fields (e.g. the query name or "qname", the record's canonical name or "cname", among others).

For each data source, a mapping is created that explicitly specifies the relationship between the fields in the reformatted entry and the original data. For example, a data source containing banner scans of IP addresses may have a column called "scanned_ip" designating the IP address scanned, "source_ip" designating the IP address that performed the scan, and "scan_time" designating the time the scan occurred. In this example, the mapping includes the "scanned_ip" and "source_ip" as lists of IP addresses associated with the scanning cyber event and "scan_time" as the single timestamp. The schema requires that at least one IP address or domain be mapped from the original data and exactly one timestamp be mapped from the original data.

The reformatting schema may be defined as an abstract Java class and explicitly specifies the mappings for the common extensible fields. The Java classes may be configured to pull the data from the original data into the corresponding fields. Using Java object classes provides access to higher order class types such as Open-Source IP Address classes. Additionally, Java objects allow for greater customization of for serializing and deserializing data for different contexts. For example, it may be advantageous to serialize the data as JSON when writing to a backend database table for simplicity of translation and human readability, but serialize the data in an optimized msgpack library when the data needs to be processed at a high throughput rate. Finally, the Java object classes may be used to define how to construct the indexing.

Once the data is reformatted, the system writes the data to a plurality of fields in a row of a rowKey table, where data entries are written in order according to contiguous IP address ranges. Additionally, IPV4, IPV6, and domain name rowKey entries are stored in separate tables. This allows all of the rowKey tables to be sorted in lexicographical order according to IP address and domain ranges. If a plurality of assets are associated with the same cyber event or datum, a different rowKey entry is created for each associated asset. In one example, if the associated cyber assets comprise IPV4, IPV6, and domain name, a rowKey entry is created in each rowKey table for the same cyber event or datum. The system reads a rowKey string for the rowKey table and generates an index for each cyber event or datum with Java object classes.

Generating Index from RowKeys Tables

First step is to ingest pDNS records into a distributed dataset, wherein all pDNS records are stored in a common file type using a common format. The pDNS records are accumulated in a streaming distributed database from a plurality of data sources and the database and structured streaming jobs are periodically performed on the database. The structured streaming jobs continuously read and process pDNS data streams from the database in small batches called micro-batches. Each micro-batch comprises a plurality of records that are grouped according to the first byte of the requesting IP addressing and written to a group file. In one aspect, the group files are stored in a data serialization format such as JSON, XML, Apache avro files, etc. A JSON based file format may be advantageous due to its ability to easily transmit data objects in a key-value pair and user friendly human readable text. Additionally, the size of the group file may be set to a predetermined size, range, or according to a micro-batch processing time.

The pDNS records are grouped or sorted according to the first byte of the requesting IP address in order to take advantage of the natural grouping of requested data. For example, a single IP addresses tend to request similar resources over time, and thus grouping the pDNS records by the first byte of the requesting IP Address improves the grouping of other fields like the qname and answer IP address, which is later indexed. Additionally, grouping the pDNS records according to the first byte of the requesting IP address reduces shuffle data costs and improves downstream DataFlow Indexer Jobs. The grouping schema also provides a coarse first index over the requesting IP, since the file path structure may be structured as follows:

service://<bucket>/<write-year>/<write-month>/<write-day>/
<write-hour>/<first-requesting-ip-byte>/<avro files>

This directory structure allows the system to query for all DNS traffic for a particular group of IP Addresses in a particular time range by reading all the data in the corresponding subdirectories.

The structured streaming job forces the micro-batch processing to start, no later than 5 minutes after the previous start time, by using a micro-batch trigger. This ensures that the processing never fully catches up to with the latest offset, which causes problems by writing group files that are too small.

The system uses a dataflow indexer (e.g., Google Cloud Dataflow) job to encode the asset identifier(s) (domain(s) or IP address(es)), observation time, and the record as an index value in a backend database table, such as Google Bigtable. This index takes the form of a set of rowKeys used by the backend database table to associate a record with a queryable field. In various aspects, the rowKey is a string that denotes the precise location of a stored row (a data element or record). Additionally, the rowKey may be used by the database table to sort rows according to their respective rowKeys. In order to enable constant-time queries for specific records (e.g. cyber assets, cyber events), several copies of the record are stored for each asset associated with the record, where each copy has a rowKey with a single asset identifier.

The file names on the distributed storage system are then written to a row in a rowKey table, where each rowKey comprises an asset identifier field, an indexed data field (e.g. cyber event data, pDNS record), and an event timestamp field. The asset identifier comprises one or more of a list of associated IP addresses and/or list of domains associated with the data field.

The database table comprises a plurality of rowKeys, where each rowKey comprises a plurality of fields in a table. In one aspect, a rowKey string denotes the precise location of a DNS record in the distributed database. The rowKey format may comprise one of the following formats:

<asset_identifier>#<observation_timestamp>#<unique_hash>
<asset_identifier>#<observation_timestamp>#<pDNS record>.
<asset_identifier>#<observation_timestamp>#
< hash_value representative of cyberEvent>.

asset_identifier: An encoding of either an IP address or a domain. IP addresses are encoded as the hexadecimal representation of the IP address bytes, 4 bytes for ipv4 and 16 bytes for ipv6. Domains are encoded as the fully qualified domain name, but reversed. For example, www.google.com is encoded com.google.www.

observation_timestamp: The timestamp of the most precise timestamp associated with the occurrence of the cyber event, encoded as an ISO 8601 string.

unique_hash: In one aspect, uniqueness of a cyber event may be the set of columns that most distinctly define the index. The unique hash is generated from a hashing algorithm that receives parameters of a cyber event as inputs. If any two recorded events have the same values for these columns, it can be determined that both records correspond to the same event. The unique hash value allows the system to de-duplicate multiple occurrences of the same data within the data table. This prevents the system from returning multiple occurrences of the same data.

Once the system writes the pDNS data records to the group files, the system reads the group files and performs a single dataflow Job Indexer operation at a predetermined indexing interval. In one aspect, the indexing interval may be performed every hour. The dataflow Job Indexer operation indexes all pDNS fields in the group files and stores the indexes to a rowKey table such as Google BigTable. To read the data from group files, the dataflow Job Indexer operation lists a predetermined number of subdirectories for the first requesting IP bytes in parallel. The list of subdirectories may comprise all files, such as 256 subdirectories for an Apache Avro file. This substantially increases read speeds over traditional reading schemas that list all the files on a single node (~256 times slower). Additionally, indexing the group files in predetermined indexing interval batches provides a substantial improvement in the indexed record throughput over a continuously streaming indexing schema. In comparison, a continuously streaming indexing schema runs the risk of processing records at a slower rate than they are received and can fall behind, or need to double-up on write jobs which strains the databasing system or "key-value" store (e.g., BigTable).

Each dataflow indexer job reads one hour's worth of the grouped file data and generates indexes for each queryable field in the pDNS record that points back to the file containing the pDNS record (and contains metadata about the record). The indexes are then grouped by the hour of the event timestamp of the pDNS record, and each group of indexes is written to a single row in the rowKey table. Grouping the pDNS indexes in hour groups uses a much smaller rowKey table cluster than it would otherwise need to store indexes for the data (~4× smaller).

In another aspect, a hash value may be generated that represents a specific type of cyber event and does not uniquely identify an instance of the cyber event. In this aspect, the same type of cyber events may be correlated to a representative hash value, such as the representative hash value disclosed in U.S. Provisional Patent Application No. 63/341,264, titled METHOD AND SYSTEM FOR SUMMARIZING ANALYTIC OBSERVATIONS, filed on May 12, 2022, the disclosure of which is herein incorporated by reference in its entirety.

In one aspect, an SIEM platform executed by an MSSP server, such as those disclosed in 63/294,570 titled DEVICES, SYSTEMS, AND METHODS FOR PROVISIONING AND UPDATING SECURITY INFORMATION & EVENT MANAGEMENT ARTIFACTS FOR MULTIPLE TENANTS, filed on Dec. 29, 2021, the disclosure of which is herein incorporated by reference in its entirety, can implement the database table to enhance network security.

For example, the cyber event data may be matched against a behavioral profile during the indexing process. Based on the behavioral profiles, the SIEM platform may identify a behavioral observation that correlates to a suspect file on a tenant's network or one of the tenant's assets. The behavioral observation data may be stored as metadata with the cyber event data or require immediate action. The SIEM platform may evaluate the suspect file and deem that immediate action is necessary when the suspect file contains malicious content such as malware, ransomware, or other content indicative of a cyberattack. In one aspect, the SIEM platform has administrator permissions that allows it to remotely delete the suspect file from one or more storage locations on the tenant's network. In another aspect, the SIEM platform directly communicates with a tenant security administrator that locally manages the tenant's network. Upon detection and evaluation of the suspect file, the SIEM platform automatically generates an alert (e.g. email, text, phone call) to the security administrator. The alert may comprise an identification of the malicious content on the suspect file, the storage location of the suspect file, and the required action or intervention to remediate the threat associated with the suspect file.

Processing and Indexing pDNS Records

In one aspect, the data indexing schema improves the processing speed and table size for processing and indexing a stream of DNS records, and the query response time for indexed pDNS records. The system receives a data stream of roughly 2 million new pDNS records every second and processes approximately 172 billion new pDNS records every day. The pDNS records enable the system to store DNS resolution data that is used to reference past DNS record values and identify potential security incidents or malicious infrastructure. DNS records are dynamic and once the DNS record changes, the previous values become difficult identify and associate with the domain. Therefore, pDNS record can be very valuable to provide a reference to the new DNS value. The pDNS records enable the system administer to determine the time when the DNS record changes, the previous DNS value, and the new DNS value. Without pDNS records, it can be difficult to identify the previous DNS records of a malicious website and associate those values with their present DNS values.

The pDNS data streams are also useful for a security operations center to identify patterns and create predictive analysis models that identify malicious actors or cyberattacks. In various aspects, the pDNS records may be used to identify: potentially malicious activity in footprints of interest, possible security appliances, the software vendors that a company of interest uses, and investigate traffic of interest for specific use-cases, etc.

Ingest pDNS Records and Grouping pDNS Records with Structured Streaming Jobs

Figure 3:
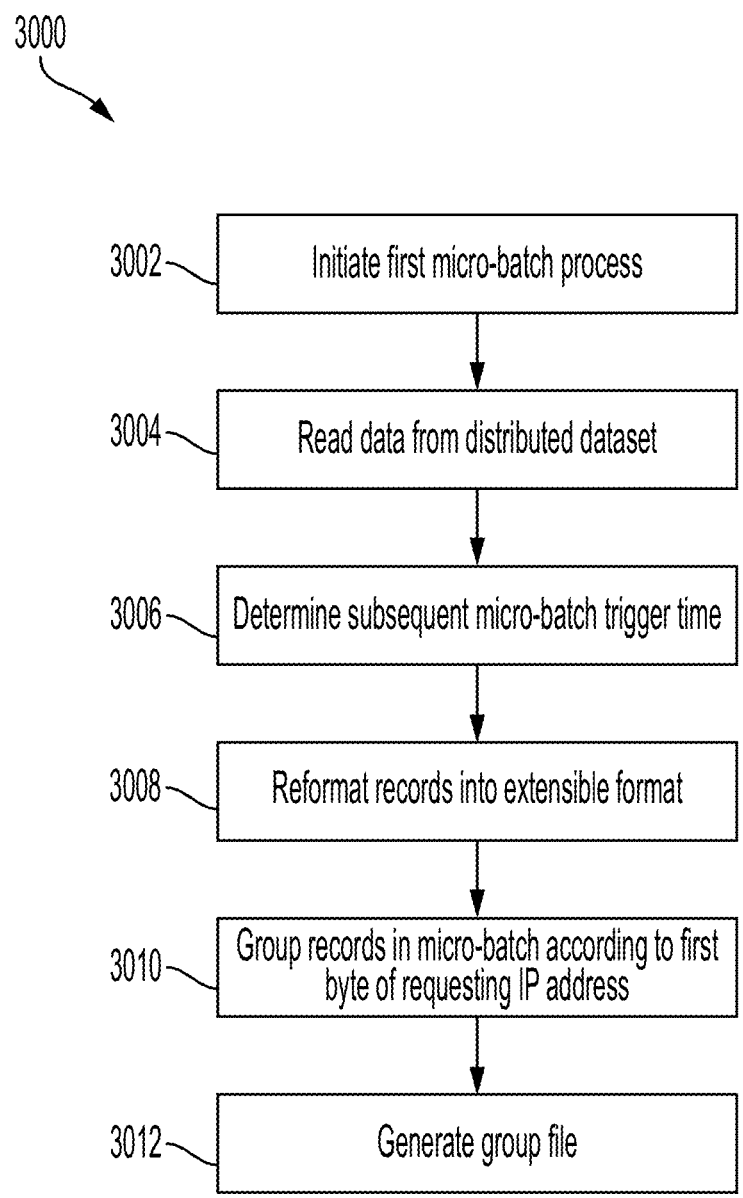
FIG. 3 illustrates a flow diagram for reformatting records form a distributed database into an extensible format, suitable for indexing, in accordance with at least one aspect of the present disclosure.

FIG. 3 shows a flow diagram for reformatting records form a distributed database into an extensible format, suitable for indexing. The system uses a structured streaming job to read and reformat the data from the distributed database by initiating 3002 a first micro-batch process. The system first reads 3004 predetermined portion of data from the distributed database in the first micro-batch. The amount of data in each micro-batch may be determined based on the predetermined trigger interval between a first micro-batch and a subsequently initiated micro-batch. Based on the initiation of the first micro-batch, the system determines 3006 whether to trigger a subsequent micro-batch. The system reformats 3008 the original record into an extensible format and groups 3010 a plurality of reformatted records according to the first byte of the requesting IP address. The system generates a group file associated with the plurality of reformatted records. In one aspect, the trigger timing between each micro-batch correlates to the size and number of records in the group file.

Dataflow Job Indexer Operation

Figure 4:
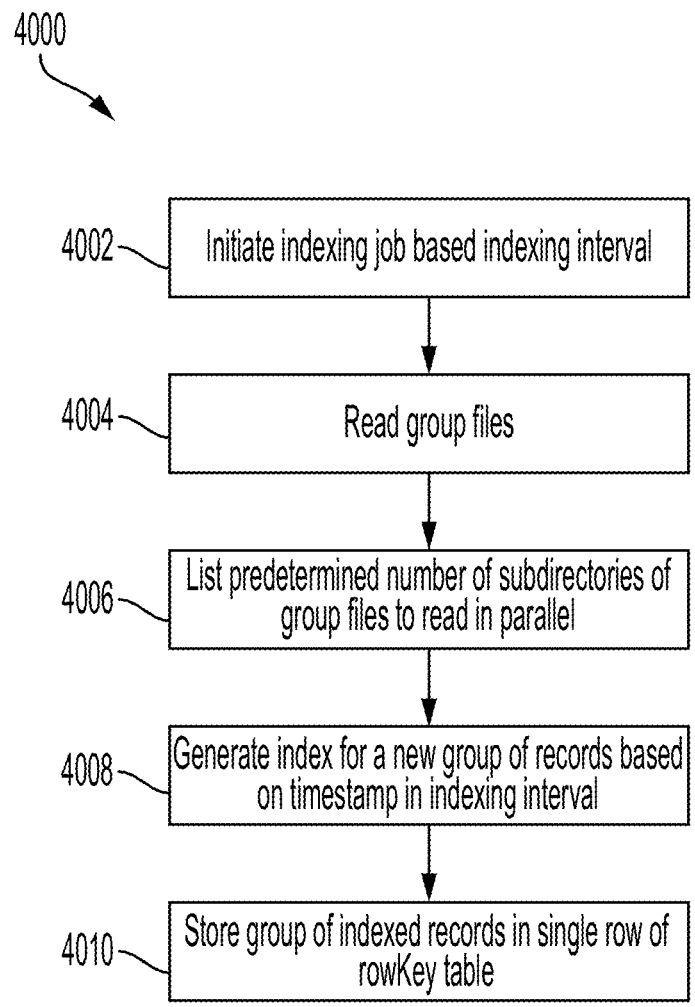
FIG. 4 illustrates a flow diagram for generating an index pointing to the location of the original record, in accordance with at least one aspect of the present disclosure.

FIG. 4 shows a flow diagram for generating an index pointing to the location of the original record. The system initiates 4002 a first dataflow indexer job based on a predetermined indexing interval. The system reads 4004 one or more group files based on the predetermined indexing interval. The system lists 4006 a predetermined number of subdirectories of the group files, such that the system can read the subdirectories in parallel. The system generates 4008 an index for all records associated with the predetermined indexing interval range, based on an index timestamp of the file. The group index is written 4010 to a single row in a rowKey table that enables a front-end computing resource to query the table and retrieve the original records from a backend server in a constant time.

Databasing Index Table

For performance purposes, the index table is a separate table in a portioned database architecture, and can be optimized according to the specific pDNS dataset. In various aspects, each row in the Index table contains indexes for a predetermined number of pDNS records, such as up to 1000 records. The indexes can be map-like objects that comprise the following structure:

```
{ "Group Filename" ->
  { BlockNumber of pDNS record-> [record metadata] } }
```

The group file block number is stored in addition to the group file name so that on reads, the query system can seek directly to the block containing the record of interest, thus improving the read performance.

Additionally, the group files are written so that there is only one pDNS record per block, which means each BlockNumber in the index uniquely identifies a single pDNS record. The record metadata contains additional fields about the pDNS record, such as whether the record was a DNS request or response, that can be used to filter out unwanted records.

To query the database, the first step is to query the backend database server with a set of predetermined parameters, such as an IP address or domain and time range of interest. The database returns indexes that identify the file and offsets into those files containing records matching the IP address or domain. The system may retrieve the records by reading the files from database of grouped files and scanning them to the corresponding record. In various aspects, pNDS records may be queried according to request IP addresses, answer IP addresses, queried domain names (qnames), and queried subdomains, wherein the processed pDNS records mapped with to domains over a predetermined time period such as several months.

Indexing Layer that Graphs IP and Domain Connections with Partial Context of pDNS Records In one aspect, the indexing database only utilizes the connections between IP addresses and domains in the DNS, rather than the full contents of DNS records. Therefore, this aspect may allow for an improvement to the read-performance by creating another index on the data. The new index represents a graph of connections between the IP addresses and domains in the data. The rowKeys for this schema may be stored in the following form:

```
<requesting IP address> # <event timestamp bin> #
<requested qname> -> metadata about the request
```

The IP graph index provides a quicker query for all domains that an IP requested in a particular time range, or find all instances where the IP address requested a domain across a particular window. The rowKeys representing connections between domains and IP addresses may be stored as the following:

```
<requested qname>#<event timestamp bin>#<requesting
    IP>→metadata about the request
```

Similarly, the domain graph index provides an efficient query for all IP addresses that are requested for a particular domain (or any particular subdomain) in a given time period. This indexing schema leverages the data indexing schema disclosed above, but with the variation of storing the data in different rowKey tables.

Figure 5:
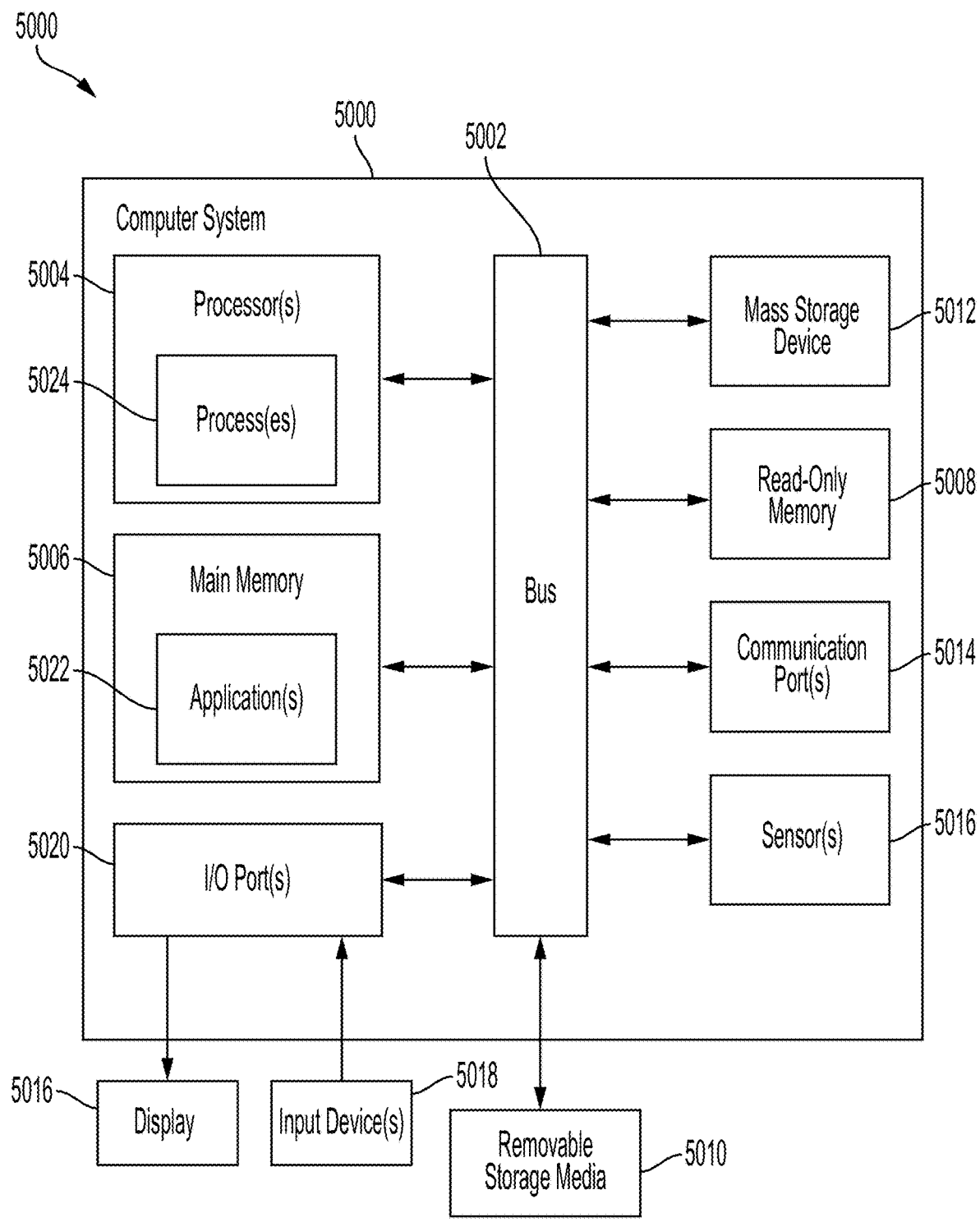
FIG. 5 illustrates a diagram of a computing system, in accordance with at least one aspect of the present disclosure.

FIG. 5 illustrates a diagram of a computing system 5000, in accordance with at least one non-limiting aspect of the present disclosure. The computing system 5000 and the various components comprised therein, as described below, may be used to implement and/or execute any of various components the systems 2000, 3000, and 4000, described hereinabove in connection with FIGS. 2-4.

According to the non-limiting aspect of FIG. 5, the computer system 5000 may include a bus 5002 (i.e., interconnect), one or more processors 5004, a main memory 5006, read-only memory 5008, removable storage media 5010, mass storage 5012, and one or more communications ports 5014. As should be appreciated, components such as removable storage media are optional and are not necessary in all systems. Communication port 5014 may be connected to one or more networks by way of which the computer system 5000 may receive and/or transmit data.

As used herein, a "processor" can mean one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 5004 can be any known processor, such as, but not limited to, processors manufactured and/or sold by INTEL®, AMD®, MOTOROLA®, and the like, that are generally well-known to one skilled in the relevant art and are well-defined in the literature. Communications port(s) 5014 can be any of an RS-232 port for use with a modem based dial-up connection, a 10/100 Ethernet port, a Gigabit port using copper or fiber, or a USB port, and the like. Communications port(s) 5014 may be chosen depending on a network such as a Local Area Network (LAN), a Wide Area Network (WAN), a CDN, or any network to which the computer system 5000 connects. The computer system 5000 may be in communication with peripheral devices (e.g., display screen 5016, input device(s) 5018) via Input/Output (I/O) port 5020.

Main memory 5006 can be Random Access Memory (RAM), or any other dynamic storage device(s) commonly known in the art. Read-only memory 5008 can be any static storage device(s) such as Programmable Read-Only Memory (PROM) chips for storing static information such as instructions for processor 5004. Mass storage 5012 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 5002 communicatively couples processor(s) 5004 with the other memory, storage, and communications blocks. Bus 5002 can be a PCI/PCI-X, SCSI, a Universal Serial Bus (USB) based system bus (or other) depending on the storage devices used, and the like. Removable storage media 5010 can be any kind of external hard-drives, floppy drives, IOMEGA® Zip Drives, Compact Disc-Read Only Memory (CD-ROM), Compact Disc-Re-Writable (CD-RW), Digital Versatile Disk-Read Only Memory (DVD-ROM), etc.

Aspects described herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, aspects described herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements that are appropriate to perform the methods.

As shown, main memory 5006 is encoded with application(s) 5022 that supports the functionality discussed herein (the application 5022 may be an application that provides some or all of the functionality of the CD services described herein, including the client application). Application(s) 5022 (and/or other resources as described herein) can be embodied as software code such as data and/or logic instructions (e.g., code stored in the memory or on another computer readable medium such as a disk) that supports processing functionality according to different aspects described herein.

During operation of one aspect, processor(s) 5004 accesses main memory 5006 via the use of bus 5002 in order to launch, run, execute, interpret or otherwise perform the logic instructions of the application(s) 5022. Execution of application(s) 5022 produces processing functionality of the service related to the application(s). In other words, the process(es) 5024 represent one or more portions of the application(s) 5022 performing within or upon the processor(s) 5004 in the computer system 5000.

It should be noted that, in addition to the process(es) 5024 that carries (carry) out operations as discussed herein, other aspects described herein include the application 5022 itself (i.e., the un-executed or non-performing logic instructions and/or data). The application 5022 may be stored on a computer readable medium (e.g., a repository) such as a disk or in an optical medium. According to other aspects, the application 5022 can also be stored in a memory type system such as in firmware, read only memory (ROM), or, as in this example, as executable code within the main memory 5006 (e.g., within Random Access Memory or RAM). For example, application 5022 may also be stored in removable storage media 5010, read-only memory 5008 and/or mass storage device 5012.

Those skilled in the art will understand that the computer system 5000 can include other processes and/or software and hardware components, such as an operating system that controls allocation and use of hardware resources.

Various aspects of the subject matter described herein are set out in the following numbered clauses:

Clause 1: A method for indexing pDNS records in scalable partitioned data tables that enable constant-time queries, the method including: receiving, by a processor, a stream of pDNS records from one or more data sources; aggregating, by the processor, the stream of pDNS records to a distributed databases; performing, by the processor, a first structured streaming job on the distributed databases, wherein the first structured streaming job processes a first micro-batch of pDNS records, reformat the records into an extensible format, groups the records according to the first byte of the requesting IP addresses, and writes the pDNS records to a group file, and wherein subsequent structure streaming jobs are continuously triggered and initiated within a predetermined time period of the prior structured streaming job; performing, by the processor, an indexing job on a plurality of group files, wherein the indexing job reads a first set of group files and generates an index for all queryable fields of a the pDNS records, and wherein a new indexing job is performed according to a predetermined indexing job interval; writing, by the processor, an index group to a first row in a rowkey table, wherein the index group is grouped according to an event timestamp of pDNS records that are indexed during the predetermined indexing job interval; querying, by the processor, the rowKey table according to a set of queryable parameters of the pDNS records, wherein the query results are returned at a constant-time.

Clause 2: The method of clause 1, wherein the group files include Apache Avro files.

Clause 3: The method of either clause 1 or 2, wherein the predetermined time period to trigger the next structured streaming job is within 5 minutes of the prior structured streaming job.

Clause 4: The method of any of clauses 1-3, wherein the predetermined indexing job interval is 1 hour.

Clause 5: The method of any of clauses 1-4, wherein the read operation of the indexing job further includes listing all file directories in the group file subdirector according to the first byte of the requesting IP address.

Clause 6: The method of any of clauses 1-6, wherein the indexed fields of the pDNS records includes the following field: requesting IP addresses, answer IP addresses, and queried domain names (qnames).

Clause 7: The method of any of clauses 1-6, wherein the set of queryable parameters for the pDNS records includes asset identifiers and timestamps, wherein the asset identifiers includes request IP addresses, answer IP addresses, queried domain names (qnames), and queried subdomains, and the timestamp includes a specific time or timestamp range.

Clause 8: The method of any of clauses 1-7, wherein each pDNS record corresponds to a Blocknumber and file name for the group file that identify the location of the pDNS record in the distributed dataset.

Clause 9: The method of any of clauses 1-8, wherein a matching query of the index group points to the file name and block number to the matching pDNS records.

Clause 10: The method of any of clauses 1-9, wherein the first structured streaming job and the indexing job are defined as higher order java classes.

Clause 11: A system for indexing records that are returned in a constant time query for a scalable database, the system including: at least one processor; at least one memory communicatively coupled to the at least one processor; an input/output interface configured for accessing data from one or more external source, each of the plurality of external sources communicatively coupled to the at least one processor; a database residing in the at least one memory and configured to store the data; and wherein the at least one memory is configured to store instructions executable by the at least one processor to: receive a stream of pDNS records from one or more data sources; aggregate the stream of pDNS records to a distributed databases; perform a first structured streaming job on the distributed databases, wherein the first structured streaming job processes a first micro-batch of pDNS records, reformat the records into an extensible format, groups the records according to the first byte of the requesting IP addresses, and writes the pDNS records to a group file, and wherein subsequent structure streaming jobs are continuously triggered and initiated within a predetermined time period of the prior structured streaming job; perform an indexing job on a plurality of group files, wherein the indexing job reads a first set of group files and generates an index for all queryable fields of a the pDNS records, and wherein a new indexing job is performed according to a predetermined indexing job interval; write an index group to a first row in a rowkey table, wherein the index group is grouped according to an event timestamp of pDNS records that are indexed during the predetermined indexing job interval; query the rowKey table according to a set of queryable parameters of the pDNS records, wherein the query results are returned at a constant-time.

Clause 12: The system of clause 11, wherein the group files includes Apache Avro files.

Clause 13: The system of either clause 11 or 12, wherein the predetermined time period to trigger the next structured streaming job is within 5 minutes of the prior structured streaming job.

Clause 14: The system of any of clauses 11-13, wherein the predetermined indexing job interval is 1 hour.

Clause 15: The system of any of clauses 11-14, wherein the read operation of the indexing job further includes listing all file directories in the group file subdirector according to the first byte of the requesting IP address.

Clause 16: The system of any of clauses 11-15, wherein the indexed fields of the pDNS records includes the following field: requesting IP addresses, answer IP addresses, and queried domain names (qnames).

Clause 17: The system of any of clauses 11-16, wherein the set of queryable parameters for the pDNS records includes asset identifiers and timestamps, wherein the asset identifiers includes request IP addresses, answer IP addresses, queried domain names (qnames), and queried subdomains, and the timestamp includes a specific time or timestamp range.

Clause 18: The system of any of clauses 11-17, wherein each pDNS record corresponds to a Blocknumber and file name for the group file that identify the location of the pDNS record in the distributed dataset.

Clause 19: The system of any of clauses 11-18, wherein a matching query of the index group points to the file name and block number to the matching pDNS records.

Clause 20: The system of any of clauses 11-19, wherein the first structured streaming job and the indexing job are defined as higher order java classes.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference, and the disclosure expressly set forth in the present application controls.

Various exemplary, and illustrative aspects have been described. The aspects described herein are understood as providing illustrative features of varying detail of various aspects of the present disclosure; and therefore, unless otherwise specified, it is to be understood that, to the extent possible, one or more features, elements, components, constituents, ingredients, structures, modules, and/or aspects of the disclosed aspects may be combined, separated, interchanged, and/or rearranged with or relative to one or more other features, elements, components, constituents, ingredients, structures, modules, and/or aspects of the disclosed aspects without departing from the scope of the present disclosure. Accordingly, it will be recognized by persons having ordinary skill in the art that various substitutions, modifications, or combinations of any of the exemplary aspects may be made without departing from the scope of the claimed subject matter. In addition, persons skilled in the art will recognize, or be able to ascertain using no more than routine experimentation, many equivalents to the various aspects of the present disclosure upon review of this specification. Thus, the present disclosure is not limited by the description of the various aspects, but rather by the claims.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one", and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one", and indefinite articles such as "a" or "an" (e.g., "a", and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A, and B together, A, and C together, B, and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A, and B together, A, and C together, B, and C together, and/or A, B, and C together, etc.). It will be further understood by those within the art that typically a disjunctive word, and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A, and B."

With respect to the appended claims, those skilled in the art will appreciate that recited operations therein may generally be performed in any order. Also, although claim recitations are presented in a sequence(s), it should be understood that the various operations may be performed in other orders than those which are described, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification,", and the like means that a particular feature, structure, or characteristic described in connection with the aspect is included in at least one aspect. Thus, appearances of the phrases "in one aspect," "in an aspect," "in an exemplification,", and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Directional phrases used herein, such as, for example, and without limitation, top, bottom, left, right, lower, upper, front, back, and variations thereof, shall relate to the orientation of the elements shown in the accompanying drawing, and are not limiting upon the claims unless otherwise expressly stated.

The terms "about" or "approximately" as used in the present disclosure, unless otherwise specified, means an acceptable error for a particular value as determined by one of ordinary skill in the art, which depends in part on how the value is measured or determined. In certain aspects, the term "about" or "approximately" means within 1, 2, 3, or 4 standard deviations. In certain aspects, the term "about" or "approximately" means within 50%, 200%, 105%, 100%, 9%, 8%, 7%, 6%, 5%, 4%, 3%, 2%, 1%, 0.5%, or 0.5% of a given value or range.

In this specification, unless otherwise indicated, all numerical parameters are to be understood as being prefaced, and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits, and by applying ordinary rounding techniques.

Any numerical range recited herein includes all sub-ranges subsumed within the recited range. For example, a range of "1 to 100" includes all sub-ranges between (and including) the recited minimum value of 1, and the recited maximum value of 100, that is, having a minimum value equal to or greater than 1, and a maximum value equal to or less than 100. Also, all ranges recited herein are inclusive of the end points of the recited ranges. For example, a range of "1 to 100" includes the end points 1, and 100. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

Any patent application, patent, non-patent publication, or other disclosure material referred to in this specification, and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material, and the existing disclosure material.

The terms "comprise" (and any form of comprise, such as "comprises", and "comprising"), "have" (and any form of have, such as "has", and "having"), "include" (and any form of include, such as "includes", and "including"), and "contain" (and any form of contain, such as "contains", and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

The foregoing detailed description has set forth various forms of the devices, and/or processes via the use of block diagrams, flowcharts, and/or examples. Insofar as such block diagrams, flowcharts, and/or examples contain one or more functions, and/or operations, it will be understood by those within the art that each function, and/or operation within such block diagrams, flowcharts, and/or examples can be implemented, individually, and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry, and/or writing the code for the software, and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

As used in any aspect herein, the term "control circuit" may refer to, for example, hardwired circuitry, programmable circuitry (e.g., a computer processor comprising one or more individual instruction processing cores, processing unit, processor, microcontroller, microcontroller unit, controller, digital signal processor (DSP), programmable logic device (PLD), programmable logic array (PLA), or field programmable gate array (FPGA)), state machine circuitry, firmware that stores instructions executed by programmable circuitry, and any combination thereof. The control circuit may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Accordingly, as used herein, "control circuit" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes, and/or devices described herein, or a microprocessor configured by a computer program which at least partially carries out processes, and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

As used in any aspect herein, the term "logic" may refer to an app, software, firmware, and/or circuitry configured to perform any of the aforementioned operations. Software may be embodied as a software package, code, instructions, instruction sets, and/or data recorded on non-transitory computer readable storage medium. Firmware may be embodied as code, instructions or instruction sets, and/or data that are hard-coded (e.g., nonvolatile) in memory devices.

As used in any aspect herein, the terms "component," "system," "module", and the like can refer to a computer-related entity, either hardware, a combination of hardware, and software, software, or software in execution.

As used in any aspect herein, an "algorithm" refers to a self-consistent sequence of steps leading to a desired result, where a "step" refers to a manipulation of physical quantities, and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These, and similar terms may be associated with the appropriate physical quantities, and are merely convenient labels applied to these quantities, and/or states.

What is claimed is:

1. A method for indexing protective Domain Name System (pDNS) records in scalable partitioned data tables that enable constant-time queries, the method comprising:
    receiving, by a processor, a data stream from one or more data sources, where the data stream comprises pDNS records;
    aggregating, by the processor, the pDNS records to a distributed database;
    performing, by the processor, a first structured streaming job on the distributed database;

performing, by the processor, an indexing job on a plurality of group files, wherein the indexing job reads a first set of group files of the plurality of group files and generates a first group index for all queryable fields of the pDNS records, and wherein a subsequent indexing job is performed according to a predetermined indexing job interval;

writing, by the processor, an index group to a first row in a rowkey table, wherein the index group is grouped according to an event timestamp of indexed pDNS records that are indexed during the predetermined indexing job interval;

querying, by the processor, the rowkey table according to a set of queryable fields of the pDNS records; and returning, by the processor, a query result at a constant-time regardless of a total number of rows in the rowkey table, wherein the first structured streaming job comprises:

processing, by the processor, a first micro-batch of the pDNS records;

reformatting, by the processor, the pDNS records into an extensible format pDNS records;

grouping, by the processor, the extensible format pDNS records according to a first byte of a requesting IP address; and writing, by the processor, the extensible format pDNS records to the first set of group file of the plurality of group files, and wherein a plurality of subsequent structure streaming jobs are continuously triggered and initiated within a predetermined time period from a prior structured streaming job.

2. The method of claim 1, wherein the plurality of group files comprises an Apache Avro file.

3. The method of claim 1, wherein the predetermined time period to trigger the plurality of subsequent structured streaming jobs is within 5 minutes of the prior structured streaming job.

4. The method of claim 1, wherein the predetermined indexing job interval is 1 hour.

5. The method of claim 1, wherein the indexing job further comprises listing all file directories in a group file subdirector according to the first byte of the requesting IP address.

6. The method of claim 1, wherein the first group index of the pDNS records comprises: requesting IP addresses, answer IP addresses, and queried domain names (qnames).

7. The method of claim 1, wherein the set of queryable fields for the pDNS records comprises asset identifiers and timestamps, wherein the asset identifiers comprises request IP addresses, answer IP addresses, queried domain names (qnames), and queried subdomains, and the timestamp comprises a specific time or timestamp range.

8. The method of claim 1, wherein each of the pDNS records corresponds to a block number and a file name for the plurality of group files that identify a location of the pDNS records in the distributed database.

9. The method of claim 8, wherein the query result comprise a matching query of the index group points to the block number and the file name of the pDNS records in the distributed database.

10. The method of claim 1, wherein the first structured streaming job and the indexing job are defined as higher order java classes.

11. The method of claim 10, wherein the first structured streaming job and the indexing job are defined as higher order java classes.

12. A system for indexing records that are returned in a constant time query for a scalable database, the system comprising:

at least one processor;

at least one memory communicatively coupled to the at least one processor;

an input/output interface configured for accessing data from one or more external source, each of the one or more external sources communicatively coupled to the at least one processor;

a database residing in the at least one memory and configured to store the data; and wherein the at least one memory is configured to store instructions executable by the at least one processor to:

receive a data stream from the one or more external sources, where the data stream comprises protective Domain Name System (pDNS) records;

aggregate the pDNS records to a distributed database;

perform a first structured streaming job on the distributed database, wherein the first structured streaming job processes a first micro-batch of pDNS records, reformat the records into an extensible format, groups the records according to a first byte of a requesting IP address, and writes the pDNS records to a first set of group files of a plurality of group files, and wherein a plurality of subsequent structure streaming jobs are continuously triggered and initiated within a predetermined time period from a prior structured streaming job;

perform an indexing job on the plurality of group files, wherein the indexing job reads the first set of group files of the plurality of group files and generates a first group index for all queryable fields of the pDNS records, and wherein a subsequent indexing job is performed according to a predetermined indexing job interval;

write an index group to a first row in a rowkey table, wherein the index group is grouped according to an event timestamp of indexed pDNS records that are indexed during the predetermined indexing job interval;

query the rowkey table according to a set of queryable fields of the pDNS records; and return a query result at a constant-time regardless of a total number of rows in the rowkey table.

13. The system of claim 12, wherein the plurality of group files comprises an Apache Avro files.

14. The system of claim 12, wherein the predetermined time period to trigger the plurality of subsequent structured streaming jobs are within 5 minutes of the prior structured streaming job.

15. The system of claim 12, wherein the predetermined indexing job interval is 1 hour.

16. The system of claim 12, wherein the indexing job further comprises listing all file directories in a group file subdirector according to the first byte of the requesting IP address.

17. The system of claim 12, wherein the index group of the pDNS records comprises: requesting IP addresses, answer IP addresses, and queried domain names (qnames).

18. The system of claim 12, wherein the set of queryable fields for the pDNS records comprises asset identifiers and timestamps, wherein the asset identifiers comprises request IP addresses, answer IP addresses, queried domain names (qnames), and queried subdomains, and the timestamp comprises a specific time or timestamp range.

19. The system of claim 12, wherein the query result comprise a matching query of the index group points to a block number and a file name of the pDNS records in the distributed database.

20. The system of claim 19, wherein the query result comprise a matching query associated with the block number and the file name of the pDNS records in the distributed database.

\* \* \* \* \*